US009701800B2

(12) United States Patent
Dümberger et al.

(10) Patent No.: US 9,701,800 B2
(45) Date of Patent: Jul. 11, 2017

(54) POLYSACCHARIDE FILM AND METHOD FOR THE PRODUCTION THEREOF

(71) Applicant: LENZING AG, Lenzing (AT)

(72) Inventors: Franz Dümberger, Lenzing (AT); Andreas Schweigart, St. Georgen im Attergau (AT); Gerold Riedl, Pfaffing (AT); Elisabeth Reiter, Seewalchen (AT); Gert Kroner, Seewalchen (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 0 days.

(21) Appl. No.: 14/782,168

(22) PCT Filed: Apr. 10, 2014

(86) PCT No.: PCT/AT2014/000076
§ 371 (c)(1),
(2) Date: Oct. 2, 2015

(87) PCT Pub. No.: WO2014/165881
PCT Pub. Date: Oct. 16, 2014

(65) Prior Publication Data
US 2016/0053061 A1    Feb. 25, 2016

(30) Foreign Application Priority Data
Apr. 10, 2013   (AT) .................... A 279/2013

(51) Int. Cl.
C08J 5/18      (2006.01)
B29C 47/00     (2006.01)

(52) U.S. Cl.
CPC ........... C08J 5/18 (2013.01); B29C 47/0021 (2013.01); B29K 2005/00 (2013.01); C08J 2305/00 (2013.01)

(58) Field of Classification Search
CPC ....................................................... C08J 5/18
See application file for complete search history.

(56) References Cited

U.S. PATENT DOCUMENTS

| | | |
|---|---|---|
| 2,179,181 A | 11/1939 | Graenacher et al. |
| 3,447,939 A | 6/1969 | Johnson |
| 4,306,059 A | 12/1981 | Yokobayashi et al. |
| 4,562,020 A | 12/1985 | Hijiya et al. |
| 5,403,530 A | 4/1995 | Taylor |
| 5,589,125 A | 12/1996 | Zikeli et al. |
| 5,725,821 A | 3/1998 | Gannon et al. |
| 5,795,522 A | 8/1998 | Firgo et al. |
| 6,042,769 A | 3/2000 | Gannon et al. |
| 6,113,842 A | 9/2000 | Weigel et al. |
| 6,821,591 B2 | 11/2004 | Gord et al. |
| 7,000,000 B1 | 2/2006 | O'Brien |
| 9,175,423 B2 * | 11/2015 | O'Brien .............. C08B 37/0009 |
| 2002/0022100 A1 | 2/2002 | Gord et al. |
| 2002/0167110 A1 | 11/2002 | Schlossnikl et al. |
| 2009/0165969 A1 | 7/2009 | Luo |

FOREIGN PATENT DOCUMENTS

| | | | |
|---|---|---|---|
| DE | 10029044 A1 | 1/2002 | |
| DE | 10035798 A1 | 1/2002 | |
| DE | 10261496 A1 | 7/2004 | |
| EP | 0 158 884 A2 | 10/1985 | |
| EP | 0 356 419 B1 | 2/1990 | |
| EP | 0 584 318 B1 | 3/1994 | |
| JP | EP 0328317 A1 * | 8/1989 | ............... C08L 5/00 |
| WO | 95/35340 A1 | 12/1995 | |
| WO | 97/07266 A1 | 2/1997 | |
| WO | 98/42492 A2 | 10/1998 | |
| WO | 00/23250 A1 | 4/2000 | |
| WO | 2013020919 A1 | 2/2013 | |
| WO | 2013036968 A1 | 3/2013 | |
| WO | 2013052730 A1 | 4/2013 | |

OTHER PUBLICATIONS

Singha, K., "Importance of the Phase Diagram in Lyocell Fiber Spinning", International Journal of Material's Engineering, (2012) pp. 10-16.
Simpson et al., "*Streptococcus salivarius*" Microbiology, vol. 41, (1995) pp. 1451-1460.
Schmidt, M., Lenzinger Berichte 9 (1994) pp. 95-97.
Ogawa, K., et al., "Crystal Structure of (1,3)-Alpha-D-Glucan", Water Soluble Polymers: Synthesis Solution Properties and Applications, American Chemical Society, vol. 141, (1980) p. 354.
Helfried Stover, "Zur Fasernassscheverung von Viskosefasern" Faserforschung und Textiltechnik 19, issue 10, (1968) pp. 447-452.
International Preliminary Report on Patentability and Written Opinion issued in International Application No. PCT/AT2014/000071 dated Oct. 6, 2015 (5 pages).
International Preliminary Report on Patentability and Written Opinion issued in International Application No. PCT/AT2014/000072 dated Oct. 6, 2015 (5 pages).
International Preliminary Report on Patentability and Written Opinion issued in International Application No. PCT/AT2014/000076 dated Oct. 13, 2015 (11 pages).

* cited by examiner

*Primary Examiner* — Patricia L. Hailey
*Assistant Examiner* — Stefanie Cohen
(74) *Attorney, Agent, or Firm* — Fitzpatrick, Cella, Harper & Scinto

(57) ABSTRACT

The present invention relates to a method for the production of films made of polysaccharides which, as a fiber-forming substance, contain $\alpha(1\rightarrow 3)$-glucan, as well as to the films made thereof and to their use.

2 Claims, No Drawings ized by this process will be described in more detail later on.
POLYSACCHARIDE FILM AND METHOD FOR THE PRODUCTION THEREOF The present is a national stage filing under 35 U.S.C. §371 of International Patent Application No. PCT/AT2014/000076, filed Apr. 10, 2014, which claims priority to Austrian Patent Application No. A279-2013 filed Apr. 10, 2013, the entire disclosure of each of which is incorporated by reference herein.

FIELD OF THE INVENTION

The present invention relates to a method for the production of films made of polysaccharides which, as a fiber-forming substance, contain □(1□3)-glucan, as well as to the films made thereof and to their use. For the purposes of the present invention, the terms "film" and "sheet" shall be used as being synonymous.

BACKGROUND OF THE INVENTION

Polysaccharides are becoming increasingly important, as they are materials that can be obtained from renewable raw materials. One of the most frequently occurring polysaccharides is cellulose. Cotton fibers, which consist almost exclusively of cellulose, are an example of the significance of polysaccharides. However, also materials obtained from other cellulosic raw materials, e.g., cellulosic synthetic fibers, are continuing to gain in importance. In addition to the fibers, there also exist other cellulosic shaped bodies; an example thereof is cellophane sheets. At present, cellulosic sheets are produced almost exclusively according to the cellophane method and are stretched one-dimensionally.

The generic name "lyocell fibers" was assigned by BISFA (the International Bureau for the Standardization of Man-made Fibers) to cellulose fibers produced from solutions in an organic solvent without the formation of a derivative.

However, to date, only one method for the large-scale production of fibers of the lyocell type has gained acceptance, namely, the amine-oxide process. In this method, a tertiary amine oxide, preferably N-methylmorpholine-N-oxide (NMMO), is used as the solvent.

Tertiary amine oxides have long been known as alternative solvents for cellulose. From U.S. Pat. No. 2,179,181, it is known, for example, that tertiary amine oxides are capable of dissolving pulp without derivatization and that cellulosic shaped bodies, e.g., fibers, can be made from these solutions. U.S. Pat. No. 3,447,939 describes cyclic amine oxides as solvents for cellulose.

From numerous patent specifications and other publications, it has been known to those skilled in the art for quite some time how this method is carried out. EP 356 419 B1, for example, describes how the solution is prepared, and EP 584 318 B1 describes how such solutions of cellulose in water-containing tertiary amine oxides are spun into fibers. DE 10261496 A1 describes the production of flat cellulosic films from such solutions, while WO 00/23250 A1 describes the production of blown cellulosic films from comparable solutions.

Cellulosic sheets made according to the amine oxide process have clear product advantages over cellophane: they possess high strength in the longitudinal and transverse directions and are, depending on their manufacture, isotropic or anisotropic.

DE 10035798 A1 describes the production of cellulosic tubular films according to the amine oxide process. In its specification (column 5, line 13), it states 50-95% by weight, particularly 70-80% by weight, as possible NMMO concentration. In all examples of DE 10035798 A1—just like in all other publications on this topic—a cellulose solution using NMMO monohydrate (87% by weight of NMMO) as a solvent is invariably used in specific embodiments. When cellulose is used as a polysaccharide, other solution compositions, that is, those having higher contents of water, can simply not be processed. Typically, for slurrying the cellulose prior to dissolving it, an aqueous NMMO solution with a higher water content is employed, and during the dissolution process in the dissolving unit the excess water is evaporated by applying negative pressure. This evaporation requires a great deal of energy and investments for the vacuum generating system.

DE 10029044 A1 also describes the production of cellulosic shaped bodies, e.g., fibers and films, according to the amine oxide process. The spinning solution may for example be produced in a filmtruder or LIST Discotherm kneader under the simultaneous evaporation of water. Also in this case, the water content of the finished spinning solution prior to the extrusion is to be 11% by weight related to the total quantity of the spinning solution. Also in this case, a great deal of evaporation energy is needed.

Even recent scientific publications do not come to any other conclusion. Singha, International Journal of Materials Engineering 2012, 2(3): 10-16, describes for the dissolution of cellulose in aqueous NMMO in great detail by means of a dissolution diagram that with a water content of more than approx. 22% by weight in the overall system cellulose will not be dissolved.

The main cellulosic raw material used in the amine oxide process is pulp obtained from wood. The cellulose molecules existing in wood and also in other plant-based sources of cellulose such as cotton linters, straw, etc. form very long chains, i.e., they exhibit a high degree of polymerization. In order to obtain a cellulose spinning solution that is well suited for large-scale processing, it is necessary to specifically adjust the degree of polymerization of the cellulose molecules, which inevitably causes part of the polymer molecules to be shortened. This takes place in the usual pulp preparation methods and also in separate pretreatment steps such as bleaching, acid treatment, or irradiation by splitting the originally long cellulose molecules. In addition to the shorter chains having the desired degree of polymerization, this also creates significantly shorter fragments such as oligomers or even monomers which remain in solution after the precipitation of the spinning solution in the precipitation bath, do not contribute to the formation of the fibers, and thus are lost. The quantities of raw material lost in this way can be substantial and can affect the cost-effectiveness of the entire amine oxide process.

U.S. Pat. No. 7,000,000 describes fibers produced by spinning a solution of polysaccharides which substantially consist of repeating hexose units linked via α(1→3)-glycosidic bonds. These polysaccharides can be produced by bringing an aqueous solution of saccharose into contact with GtfJ glucosyltransferase, isolated from Streptococcus salivarius (Simpson et al. Microbiology, vol. 41, pp 1451-1460 (1995)). As used in this context, "substantially" means that within the polysaccharide chains there may exist occasional defective locations where other bond configurations may occur. For the purposes of the present invention, these polysaccharides are referred to as "α(1→3)-glucan".

U.S. Pat. No. 7,000,000 first discloses possibilities for the enzymatic production of α(1→3)-glucan from monosaccharides. In this way, relatively short-chained polysaccharides can be produced without the loss of monomer units, as the polymer chains are built from the monomer units. Contrary to the production of short-chained cellulose molecules, the production of α(1→3)-glucan keeps getting less expensive the shorter the polymer chains are, as in that case the required residence time in the reactors will be short.

According to U.S. Pat. No. 7,000,000, the α(1→3)-glucan is to be derivatized, preferably acetylated. Preferably, the solvent is an organic acid, an organic halogen compound, a fluorinated alcohol, or a mixture of such components. These solvents are costly and complex to regenerate.

Therefore, attempts were made to use α(1→3)-glucans instead of cellulose for the production of polysaccharide fibers in an amine oxide process under commercially applied large-scale process conditions. Unfortunately, it was found that under these conditions α(1→3)-glucans could not be processed satisfactorily into fibers. In particular, the individual fibers would frequently stick together, making them unmarketable.

Object

In view of such prior art, the object was to provide polysaccharide films and a method for their production, which did not include the above mentioned disadvantages. In particular, the production method was to be more cost-effective to execute as compared to the production of cellulose films according to the amine oxide process.

DESCRIPTION OF THE INVENTION

The above described object is solved by a method for the production of a polysaccharide film, wherein the finished spinning solution for the extrusion comprises an amine oxide, at least 23% by weight, preferably at least 26% by weight, of water, related to the total quantity of the spinning solution, and α(1→3)-Glucan as a polysaccharide. This makes it possible to do without the use of a combined evaporation and dissolution unit, e.g., a filmtruder or thick layer kneader (LIST Discotherm or the like).

For the purposes of the present invention, the terms "film" and "sheet" shall be used as being synonymous.

The method for the preparation of the inventive film consists of the following steps:

1. Preparation of a spinning solution containing aqueous amine oxide and α(1→3)-glucan. For this purpose, using the above mentioned methods that are generally known for the production of cellulose amine oxide solutions is possible.

2. Extruding the spinning solution through a die, via an air gap under stretching, and into a spinning bath containing an aqueous amine oxide, washing the regenerated film for removal of amine oxide, and drying.

The concentration of the α(1→3)-glucan substance in the spinning solution may be between 5 and 20% by weight, preferably between 8 and 15% by weight.

Preferably, the amine oxide is N-methylmorpholine-N-oxide.

The α(1→3)-glucan used according to the invention can be prepared by bringing an aqueous solution of saccharose into contact with GtfJ glucosyltransferase isolated from Streptococcus salivarius (Simpson et al. Microbiology, vol. 41, pp 1451-1460 (1995)).

In a preferred embodiment of the method according to the invention, at least 90% of the α(1→3)-glucan are hexose units and at least 50% of the hexose units are linked via α(1→3)-glycosidic bonds.

The degree of polymerization of the α(1→3)-glucan employed in the method according to the invention, expressed as weight average $DP_w$, may be between 200 and 2000; values between 500 and 1000 are preferred.

Surprisingly, it was also discovered that the method according to the invention not only permits the use of dry α(1→3)-glucan. Also the use of water-containing, especially of initially moist α(1→3)-glucan which was never dried after having been produced, is possible. This procedural variant only requires the appropriate adaptation of the water content of the amine oxide to be added. This further reduces the total energy to be used for the evaporation of water. This variant is of great economic interest especially if the plant for the production of the α(1→3)-glucan is located directly adjacent the plant for the production of the inventive film.

The extrusion and shaping, respectively, of the spinning mass according to the invention can be performed by means of generally known methods: either in a flat film process by means of a straight slot die or by means of an annular slot die in a tubular film process as is known, e.g., from WO 98/42492 A2, or in a blown film process known, e.g., from WO 95/35340 A1 or WO 00/23250 A1.

Typically, the spinning solution is stretched following the extrusion. This may either take place only in one direction, i.e., axially, or both in the machine direction and transversely to it, i.e., biaxially. Preferably, the relevant stretching is carried out in the air gap prior to entry into the spinning bath.

A polysaccharide film characterized in that the film-forming substance consists substantially of α(1→3)-glucan is also subject-matter of the present invention.

In a preferred embodiment, at least 90% of the α(1→3)-glucan are hexose units and at least 50% of the hexose units are linked via α(1→3)-glycosidic bonds.

The degree of polymerization of the α(1→3)-glucan employed in the method according to the invention, expressed as weight average $DP_w$, may be between 200 and 2000; values between 500 and 1000 are preferred.

In a preferred embodiment, the inventive polysaccharide film is oriented in at least one dimension. In another preferred embodiment, the inventive polysaccharide film is oriented in two dimensions perpendicular to one another. The orientation is carried out by suitable stretching, preferably in the air gap prior to entry into the spinning bath.

The invention will be described below with reference to examples. However, the invention is not expressly limited to these examples but also includes all other embodiments that are based on the same inventive concept.

EXAMPLE

In the following, the percentage values are always stated in percent by weight, unless otherwise specified.

Example 1

The α(1→3)-glucan is first suspended in aqueous NMMO 50%, and then converted with NMMO 78% into a spinning solution containing 10% α(1→3)-glucan, 29.9% water, 60% NMMO, and 0.1% propyl gallate as a stabilizer. The propyl gallate was stirred in 2155 g of aqueous NMMO 50%, then 567 g of α(1→3)-glucan were mixed in slowly and stirred for 15 minutes using an Ultraturrax® T50, 2559 g of aqueous NMMO 78% were added to this suspension, and 106 g of water were removed.

The spinning solution was extruded at 100° C. through a 60 mm long film die having a 350 μm wide slot, with an output of 26.9 g of spinning mass per minute, subjected to a draft of 1:2, coagulated in a precipitation bath, washed with water to remove the NMMO completely, dried, and wound up.

The produced film had the following characteristics: film thickness: 11 um, longitudinal strength: 87 Mpa, transverse strength: 41 Mpa, longitudinal elongation at break: 5.2%.

Example 2 (Reference Example)

Pulp is converted with aqueous NMMO 78% into a spinning solution containing 10% cellulose, 11.9% water, 78% NMMO, and 0.1% propyl gallate as a stabilizer.

The GPE was stirred in 5000 g of aqueous NMMO 78%, then 532 g of cellulose were mixed in, followed by the removal of 532 g of water under vacuum from this suspension.

The spinning solution was extruded at 100° C. through a 60 mm long film die having a 350 μm wide slot, subjected to a draft of 1:2, the shaped body was coagulated in a precipitation bath, washed with water to remove the NMMO completely, dried, and wound up.

The produced film had the following characteristics: film thickness: 11 um, longitudinal strength: 173 Mpa, transverse strength: 84 Mpa, longitudinal elongation at break: 7.1%.

What is claimed is:

1. A polysaccharide film comprising a film-forming substance, wherein the film forming substance consists essentially of α(1→3)-glucan, wherein at least 90% of the α(1→3)-glucan consist of hexose units and at least 50% of the hexose units are linked via α(1→3)-glycosidic bonds.

2. The polysaccharide film according to claim 1, wherein the film is oriented at least in one dimension.

* * * * *

UNITED STATES PATENT AND TRADEMARK OFFICE
CERTIFICATE OF CORRECTION

PATENT NO. : 9,701,800 B2  
APPLICATION NO. : 14/782168  
DATED : July 11, 2017  
INVENTOR(S) : Franz Dürnberger et al.

Page 1 of 1

It is certified that error appears in the above-identified patent and that said Letters Patent is hereby corrected as shown below:

On the Title Page

[12] "Dumberger et al." should read --Dürnberger et al.--;  
[72] "Dumberger et al." should read --Dürnberger et al.--;  
[56] "JP EP 0328317" should read --EP 0328317--.

In the Specification

Column 1:  
Line 15, "☐ (1☐ 3)" should read --α (1 →3)--.

Column 4:  
Line 46, "EXAMPLE" should read --EXAMPLES--.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*